(12) United States Patent
Mengerink

(10) Patent No.: US 7,831,520 B2
(45) Date of Patent: Nov. 9, 2010

(54) MOBILE DEVICE COMMUNICATION SYSTEM

(75) Inventor: Matthew Mengerink, San Jose, CA (US)

(73) Assignee: eBay Inc., San Jose, CA (US)

( * ) Notice: Subject to any disclaimer, the term of this patent is extended or adjusted under 35 U.S.C. 154(b) by 943 days.

(21) Appl. No.: 11/168,277

(22) Filed: Jun. 28, 2005

(65) Prior Publication Data

US 2006/0294025 A1 Dec. 28, 2006

(51) Int. Cl.
*G06Q 20/00* (2006.01)
(52) U.S. Cl. .................. 705/64; 705/14.23; 705/14.39; 707/607; 379/90.02; 379/91.01; 379/93.12
(58) Field of Classification Search ................... 705/26, 705/64
See application file for complete search history.

(56) References Cited

U.S. PATENT DOCUMENTS

| | | | |
|---|---|---|---|
| 4,454,414 A | | 6/1984 | Benton |
| 4,731,842 A | | 3/1988 | Smith |
| 5,684,861 A | * | 11/1997 | Lewis et al. ................. 455/405 |
| 5,713,072 A | * | 1/1998 | Marth et al. ................ 455/410 |
| 5,715,314 A | | 2/1998 | Payne et al. |
| 5,778,178 A | | 7/1998 | Arunachalam |
| 5,844,221 A | | 12/1998 | Madigan, Jr. et al. |
| 5,857,152 A | | 1/1999 | Everett |
| 5,860,362 A | | 1/1999 | Smith |
| 5,884,290 A | | 3/1999 | Smorodinsky et al. |
| 5,892,900 A | | 4/1999 | Ginter et al. |
| 5,983,094 A | * | 11/1999 | Altschul et al. ............. 455/413 |

(Continued)

FOREIGN PATENT DOCUMENTS

CN 803346.3 8/2001

(Continued)

OTHER PUBLICATIONS

"Met Authorization for account based payment using SET Wallet Server" Version A (Feb. 21, 2001).*

(Continued)

*Primary Examiner*—Evens J Augustin
*Assistant Examiner*—Calvin K Cheung
(74) *Attorney, Agent, or Firm*—Schwegman, Lundberg & Woessner, P.A.

(57) ABSTRACT

A method and system to conduct financial transactions over a communication network is provided. Data associated with a mobile communication device user is received and stored, and a user mobile airtime account is allocated to the user. A purchase request is received from the user via a mobile communication device, the purchase request being for a purchase from a merchant for a purchase amount. The communication network provides the user access to the network to make the purchase request without debiting a financial account of the user or the user mobile airtime account for the access to the communication network. A payment service provider now automatically debits the financial account of the user with the purchase amount, automatically allocates a service fee which is associated with the purchase amount to the mobile service provider and credits an account of the mobile service provider with the service fee. The payment service provider also automatically credits an account of the merchant with at least a portion of a remainder of the purchase amount.

24 Claims, 6 Drawing Sheets

U.S. PATENT DOCUMENTS

| | | | |
|---|---|---|---|
| 5,987,500 A | 11/1999 | Arunachalam | |
| 6,012,049 A | 1/2000 | Kawan | |
| 6,039,250 A | 3/2000 | Ito et al. | |
| 6,169,890 B1 | 1/2001 | Vatanen | |
| 6,175,741 B1* | 1/2001 | Alperovich | 455/458 |
| 6,212,556 B1 | 4/2001 | Arunachalam | |
| 6,311,170 B1* | 10/2001 | Embrey | 705/40 |
| 6,327,578 B1 | 12/2001 | Linehan | |
| 6,564,047 B1* | 5/2003 | Steele et al. | 455/405 |
| 6,609,113 B1 | 8/2003 | O'Leary et al. | |
| 6,806,110 B2 | 10/2004 | Lester | |
| 6,808,110 B1 | 10/2004 | Von Brockdorff | |
| 6,845,361 B1* | 1/2005 | Dowling | 705/5 |
| 6,937,731 B2* | 8/2005 | Chiu | 380/270 |
| 7,103,576 B2 | 9/2006 | Mann, III et al. | |
| 7,158,753 B2 | 1/2007 | Kagan et al. | |
| 7,194,427 B1* | 3/2007 | Van Horn et al. | 705/26 |
| 7,295,992 B2* | 11/2007 | Villaret et al. | 705/16 |
| 7,376,587 B1 | 5/2008 | Neofytides et al. | |
| 7,685,020 B2* | 3/2010 | Do et al. | 705/26 |
| 2002/0029190 A1 | 3/2002 | Gutierrez-Sheris | |
| 2002/0029193 A1 | 3/2002 | Ranjan et al. | |
| 2002/0052754 A1* | 5/2002 | Joyce et al. | 705/1 |
| 2002/0095372 A1 | 7/2002 | Likourezos et al. | |
| 2002/0095376 A1 | 7/2002 | Likourezos et al. | |
| 2002/0095377 A1 | 7/2002 | Likourezos et al. | |
| 2002/0120582 A1* | 8/2002 | Elston et al. | 705/64 |
| 2002/0143638 A1* | 10/2002 | August et al. | 705/26 |
| 2002/0143655 A1* | 10/2002 | Elston et al. | 705/26 |
| 2003/0014327 A1* | 1/2003 | Skantze | 705/26 |
| 2003/0014359 A1 | 1/2003 | Kavounas | |
| 2003/0026404 A1* | 2/2003 | Joyce et al. | 379/144.01 |
| 2003/0046094 A1 | 3/2003 | Singh et al. | |
| 2003/0096596 A1* | 5/2003 | Sini et al. | 455/412 |
| 2003/0152039 A1* | 8/2003 | Roberts | 370/255 |
| 2003/0154139 A1* | 8/2003 | Woo | 705/26 |
| 2003/0233317 A1 | 12/2003 | Judd | |
| 2003/0233318 A1 | 12/2003 | King et al. | |
| 2004/0030601 A1* | 2/2004 | Pond et al. | 705/16 |
| 2004/0133622 A1* | 7/2004 | Clubb et al. | 709/200 |
| 2004/0139000 A1 | 7/2004 | Amos | |
| 2005/0033684 A1* | 2/2005 | Benedyk et al. | 705/39 |
| 2005/0125315 A1* | 6/2005 | Munoz et al. | 705/30 |
| 2005/0267816 A1* | 12/2005 | Jaramillo | 705/26 |
| 2006/0116105 A1* | 6/2006 | Frankel et al. | 455/406 |
| 2006/0229998 A1 | 10/2006 | Harrison et al. | |
| 2007/0005432 A1 | 1/2007 | Likourezos et al. | |
| 2007/0118476 A1 | 5/2007 | Likourezos et al. | |

FOREIGN PATENT DOCUMENTS

| | | |
|---|---|---|
| DE | 4425271 | 1/1996 |
| DE | 69314804 | 11/1997 |
| DE | 19706174 A1 | 8/1998 |
| DE | 69503755 | 9/1998 |
| DE | 19724901 | 12/1998 |
| DE | 19706174 C2 | 3/2000 |
| DE | 199 03 822.8 | 8/2000 |
| EP | 848360 A1 | 6/1998 |
| TR | 2001/02216 | 1/2002 |
| WO | WO-9402909 | 2/1994 |
| WO | WO-9736268 A2 | 3/1997 |
| WO | WO-9722953 | 6/1997 |
| WO | WO-9811519 | 3/1998 |
| WO | WO-9847116 | 10/1998 |
| WO | WO-9852151 | 11/1998 |
| WO | WO-0219225 A2 | 3/2002 |
| WO | WO02071354 A2 * | 9/2002 |
| WO | WO-03036435 A2 | 5/2003 |

OTHER PUBLICATIONS

Tan, Clarense N.W, & Teo, T.W. "From e-commerce to m-commerce: The power of the mobile Internet" Jan. 2001.*

Chudasama, J. "U-Commerce: Integrating business anywhere".*

"3D Secure Mobile Authenication Scenarios" (Version 1.0). Jun. 30, 2002. Visa.*

Hafner, K. "Will That Be Cash or Cell Phone?: Wireless Payment Systems Might Mean Dialing Inot Your Own Wallet". Mar. 2, 2000.*

Sony Ericsson P800/P802 Manual. Jan. 2003. pp. 64-65.*

Lee et. al. "A System Model for Mobile Commerce". 2003.*

International Telecommunication Union. "3G: All About Technology." Dec. 5, 2003. Retrieved via Wayback Machine on Dec. 1, 2009. [URL: http://www.itu.int/osg/spu/ni/3g/technology/index.html].*

"Prepaid Virtual Top Up", http://www.prism.co.za/prepaid-virtual-topup.htm *PRISM Trusted Transactions*, Visited Apr. 5, 2005, 1 pg.

"Secure Electronic Payment Across Wired and Wireless Networks", Prism VTU; *Prepaid Voucherless Top-Up Solution (VTU)* http://www.prism.co.za/main.asp?ID=745&RootItemID=1 PRISM Trust Transactions, Visited Apr. 5, 2005, 1-2.

"Secure Electronic Payment Across Wired and Wireless Networks", *Mobile Voucherless TopUp, an innovative job creation solution for Africa* http://www.prism.co.za/main.asp?ID=752_PRISM_Trust Transactions, Visited Apr. 5, 2005, 1-2.

"Secure Electronic Payment Across Wired and Wireless Networks", *Mobile Voucherless TopUp,the ideal African GSM Solution* http://www.prism.co.za/main.asp?ID=751_PRISM Trust Transactions, Visited Apr. 5, 2005, 1-2.

"The One Account", *First National Bank*, https://fnb.co.za/FNB/content/services/mobile/cellphoneBanking.scm1, Visited Apr. 5, 2005, 1-2.

"'Park and ring' scheme launched", *BBC News*, http://newsvote.bbc.co.uk/mpapps/pagetools/print/news.bbc.co.uk/2/hi/uk_news/scotland/3229217.stm, (Oct. 31, 2003), 2 Pages.

"Buying Ice-Cream by SMS", http://www.texturally.org/textually/archives/002629.htm, (Dec. 18, 2003),1 Page.

"Dutch Attraction Park Pilots Mobile Ticketing", http://www.texturally.org/textually/archives/002549.htm, (Dec. 10, 2003), 1 Page.

"Globe AutoloadMAX in Shell", http://www1.globe.com.ph/whatsnew.aspx?SectionID=105, (Jun. 4, 2004),5 Pages.

"Mobilkom Austria and Siemens Make "m-parking" a Reality for Drivers", *VIPnet, VIP Power of Communication*, http://www.vipnet.hr/cw/d_show?idc=3958844&idnews=151154&page=4, (Oct. 7, 2002),2 Pages.

"Nokia and Visa enter secure mobile shopping alliance", *finextra.com*, http://www.finextra.com/topstory.asp.?id=10010, (Sep. 23, 2003),2 Pages.

"Now you can SMS for a chocolate—Cadbury BPL Mobile, E Cube tie-up for venture", *Business Line Internet Edition*, http://www.blonnet.com/2003/08/08/stories/2003080802470100.htm, (Aug. 8, 2003),3 Pages.

"Services—Centers of Excellence—Payment Systems", http://www.iflexsloutions.com/print/services/pr_payment.asp, (Jun. 10, 2004),2 Pages.

"World's first from Telenor: SMS turns mobile phone into airline ticket", http://press.telenor.com/PR/200401/930138_5.html._ Telenor Press Release, 2 Pages.

Cheong, Yu C., "Payments in Mobile Commerce", *Telecom Media Networks, Wireless Internet Centre*, http://www.apc.capgemini.com/industry/telecom/attachments/Payments%20in%20Mobile%20Commerce.pdf,(2002),1-25.

Choi, Hyungki , et al., "Design of secure mobile payment", *ICU PowerPoint Presentation*, (Apr. 3, 2002), 1-7.

Ding, Melissa S., "Reconsidering the Challenges of mPayments: A Roadmap to Plotting the Potential of the Future mCommerce Market", *16th Bled eCommerce Conference, eTransformation*, Bled, Slovenia,(Jun. 9-11, 2003),873-884.

Kreyer, Nina , "Characteristics of Mobile Payment Procedures", *Proceedings of the ISMIS 2002*, (2002),1-13.

Little, Arthur D., "Making M-Payments a Reality", *Arthur D. Little Global M-Payment Report 2004*, http://www.adlittle.de/downloads/artlikeI/MPayment_press%20release_English_Final.pdf,(2004),1-5.

McKitterick, David, "State of the Art Review of Mobile Payment Technology", *Trinity College Dublin—Computer Science Department, Technical Reports*, (Jun. 13, 2003),1-22.

Ondrus, Jan, et al., "A Distruption Analysis in the Mobile Payments Market", *38th Annual Hawaii International Conference on System Sciences (HICSS'05)*, (Jan. 3-6, 2005),1-10.

Ondrus, Jan, "Mobile Payments: A Tool Kit for a Better Understanding of the Market", *License Thesis—University of Lausanne*, (Jul. 2003),1-38.

Panis, Stathis, et al., "Mobile Commerce Service Scenarios and Related Business Models", *Proceedings of the 1st International Conference on Mobile Business*, (Jul. 8-9, 2002),10 Pages.

Peirce, Michael, "Multi-Party Electronic Payments for Mobile Communications", *A thesis submitted for the degree of Doctor of Philosophy in Computer Science, University of Dublin, Trinity College, Department of Computer Science*, (Oct. 31, 2000),1-219.

Prystay, Cris, "Nestle Rings Up Customers with Text Messaging Games", http://www.chikka.com/article_nestle.html, (Jun. 2002),2 Pages.

Varshney, Upkar, "A Framework for the Emerging Mobile Commerce Applications", *Proceedings of the 34th Hawaii International Conference on System Sciences—2001*,1-10.

U.S. Appl. No. 10/910,041 Response filed Jul. 17, 2008 to Non-Final Office Action mailed Mar. 17, 2008, 20 pgs.

U.S. Appl. No. 10/910,041 Non-Final Office Action mailed Mar. 17, 2008, OARN, 2 pgs.

U.S. Appl. No. 10/910,041, Preliminary Amendment mailed Aug. 24, 2006, 15 pgs.

"Electronic Payments in America: Today and Tomorrow", http://www.starnewsletters.com/article.cfm?id=98, (Fall, 2005).

"Tech Crunch Article and Comments", http://www.techcrunch.com/2006/02/15/everyone-send-me-5, (Feb. 15, 2006).

"Using your Cellphone as a Credit Card", *The Wall Street Journal Online. WSJ.com*, (Feb. 8, 2006).

U.S. Appl. No. 11/095,411 Non-Final Office Action mailed Feb. 27, 2009, 26 pgs.

U.S. Appl. No. 10/910,041, Examiner Interview Summary mailed Jun. 8, 2009, 3 pgs.

U.S. Appl. No. 10/910,041, Response filed Nov. 17, 2008, to Restriction Requirement mailed Oct. 17, 2008, 12 pgs.

U.S. Appl. No. 10/910,041, Restriction Requirement mailed Oct. 17, 2008, 6 pgs.

U.S. Appl. No. 11/095,411, Non-Final Office Action mailed Feb. 27, 2009, 13 pgs.

U.S. Appl. No. 11/095,411, Preliminary Amendment mailed Feb. 23, 2007, 11 pgs.

U.S. Appl. No. 11/095,411, Preliminary Amendment mailed Aug. 25, 2005, 8 pgs.

U.S. Appl. No. 11/095,411, Response filed May 27, 2009 to Non Final Office Action mailed Feb. 27, 2009, 14 pgs.

U.S. Appl. No. 10/910,041, Non-Final Office Action mailed Oct. 28, 2009, 3 pgs.

U.S. Appl. No. 10/910,041, Response filed Sep. 8, 2009 to Restriction Requirement mailed Aug. 6, 2009, 15 pgs.

U.S. Appl. No. 10/910,041, Response filed Jan. 28, 2010 to Non Final Office Action mailed Oct. 28, 2009, 24 pgs.

U.S. Appl. No. 10/910,041, Restriction Requirement mailed Aug. 6, 2009, 6 pgs.

U.S. Appl. No. 11/095,411, Final Office Action mailed Aug. 28, 2009, 17 pgs.

U.S. Appl. No. 11/095,411, Non-Final Office Action mailed Dec. 28, 2009, 15 pgs.

U.S. Appl. No. 11/095,411, Response filed Oct. 28, 2009 to Final Office Action mailed Aug. 28, 2009, 13 pgs.

\* cited by examiner

MOBILE DEVICE COMMUNICATION SYSTEM

TECHNICAL FIELD

The present application relates generally to the technical field of mobile device communication and in particular to a system and method to conduct financial transactions over a communication network.

BACKGROUND

Mobile commerce, (aka "MCOMMERCE"), e.g., the use of mobile communication devices for commercial and financial transactions, came into existence in the 1990's. The general view at the time was that mobile payment technologies would develop, mature and become widely available. However, in recent years it has been found that mobile commerce has not been adopted on a large enough scale to make it viable, and it is now accepted that it is necessary for mobile commerce to first become easier to use, cheaper and to attain sufficient economies of scale, before it will become more popular to use for both users and providers.

One limitation identified in the implementation of mobile commerce is that a person has to own a mobile communication device and has to have airtime available to conduct financial transactions. There accordingly exists a potential market of people who have up to now not been interested in owning mobile communication devices. A typical reason for not owning a mobile communication device is that a person may want to avoid the potential expenditure associated with owning and using a mobile communication device.

SUMMARY

According to one embodiment, there is provided a system to conduct financial transactions over a communication network, the system including:

a database storing data associated with a mobile communication device user, the data including a user mobile communication device identifier, a user mobile airtime account identifier and a financial account identifier to identify a financial account associated with the user;

purchase request infrastructure to receive a purchase request from the user via a mobile communication device, the purchase request being for a purchase from a merchant for a purchase amount;

an access module with screening logic to identify the purchase request and to provide the user access to the communication network to make the purchase request without debiting the financial account of the user or the user mobile airtime account for the access to the communication network;

a payment service provider system to:

provide the merchant with the purchase request;

automatically debit the at least one financial account of the user with the purchase amount;

automatically allocate a service fee which is associated with the purchase amount to the mobile service provider and credit an account of the mobile service provider with the service fee; and automatically credit an account of the merchant with at least a portion of the purchase amount.

According to a further embodiment, there is provided a method to conduct financial transactions over a communication network, the method including:

receiving and storing data associated with a mobile communication device user, the data identifying at least one financial account of the user;

allocating a user mobile airtime account to the user to manage the airtime availability of the user;

receiving a purchase request from the user via a mobile communication device, the purchase request being for a purchase from a merchant for a purchase amount;

providing the user access to the communication network to make the purchase request without debiting the financial account of the user or the user mobile airtime account for the access to the communication network;

providing the merchant with the purchase request;

automatically debiting the at least one financial account of the user with the purchase amount;

automatically allocating a service fee which is associated with the purchase amount to the mobile service provider and crediting an account of the mobile service provider with the service fee; and automatically crediting an account of the merchant with at least a portion of a remainder of the purchase amount.

Other features will be apparent from the accompanying drawings and from the detailed description that follows.

BRIEF DESCRIPTION OF THE DRAWINGS

Embodiments of the present invention are illustrated by way of example and not limitation in the figures of the accompanying drawings, in which like references indicate similar elements and in which.

DETAILED DESCRIPTION

A mobile device communication system is described, the system being used in a method for conducting financial transactions over a communication network.

Figure 1:
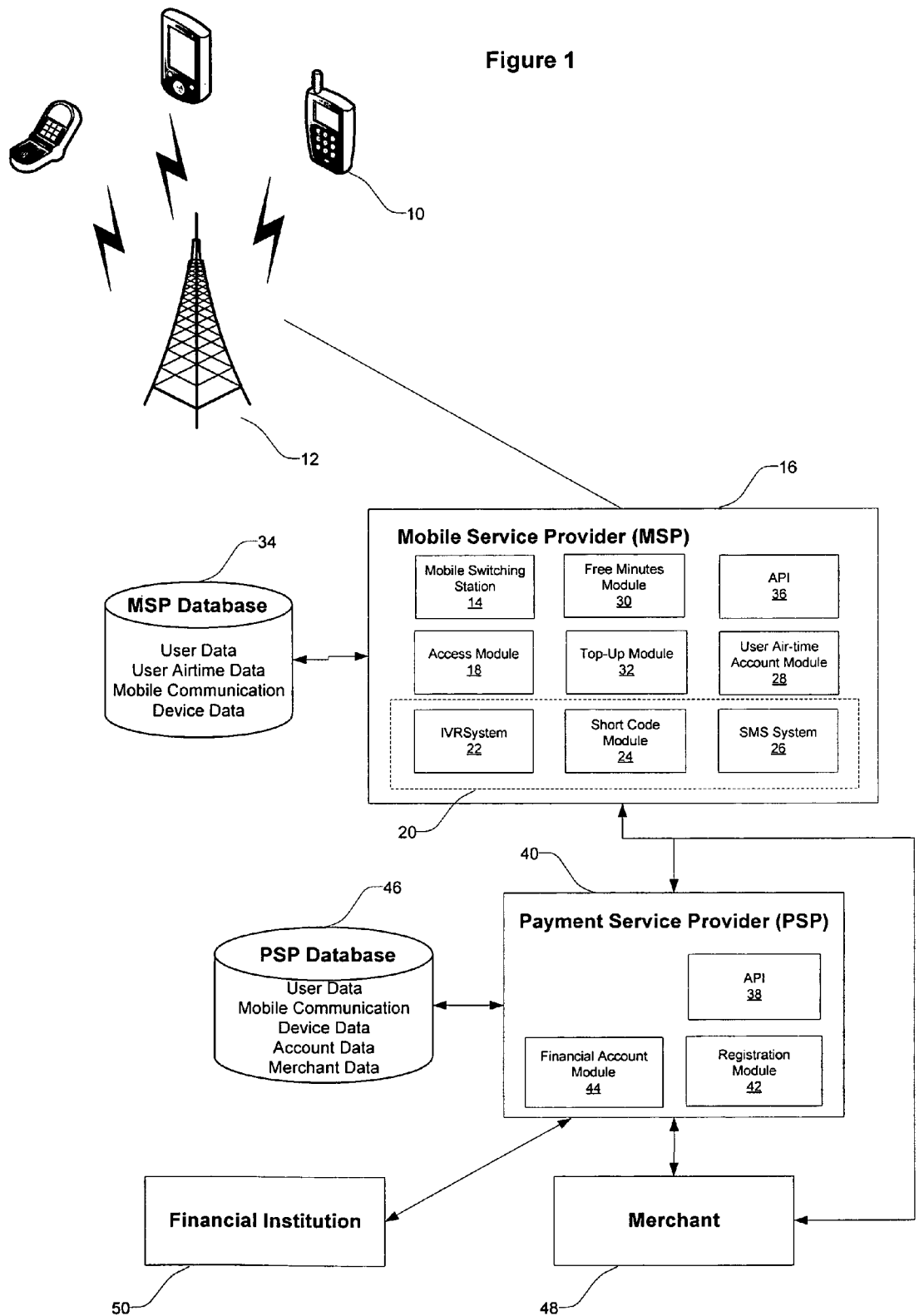
FIG. 1 is a block diagram illustrating a system to implement a method to conduct financial transactions over a communication network according to an example embodiment of the present invention.

FIG. 1 illustrates a block diagram of the system according to an example embodiment of the present invention.

Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

The method and system of the invention may be implemented in a modern telephony network, such as a wireless network, and in one example embodiment in an intelligent network (IN) platform which comprises a plurality of distributed and scalable network nodes which handle call setup logic and specialized routing instructions. The example method and system may also be implemented across multiple telephony networks that are linked but operated by different operators.

FIG. 1 shows, in a simplified schematic form, the architecture of a part of a modern GSM-CDMA or other mobile telephone network. FIG. 1 does not purport to be comprehensive but merely illustrative. The network embodies intelligent network (IN) functionality, but this is not essential for implementation of the invention.

In FIG. 1, a mobile communication device 10 of a user communicates with a base station 12, which in turn communicates with a mobile switching center (MSC) 14. The mobile communication device 10 is typically a mobile or cellular telephone, a smart phone or a Personal Digital Assistant (PDA). The mobile communication device 10 has a unique device identifier, such as an international mobile subscriber identity (IMSI), associated with it. The base station 12 comprises a base station controller (BSC) and a base transceiver station (BTS) with associated antenna (not shown).

The mobile switching center (MSC) 14 forms part of the architecture of the Mobile Service Provider (MSP) system 16 and communicates with an access module 18 of the MSP architecture. The access module 18 or service control point has screening logic to identify a purchase request received from a user via the user's mobile communication device 10. Purchase request infrastructure 20, typically systems such as an interactive voice response (IVR) system 22, a short code module 24 or a short message service (SMS) module 26, receives the purchase request from the mobile communication device 10 via the mobile switching station 14.

A user mobile airtime account module 28 is connected to the access module 18 and manages airtime availability of users through user airtime accounts. The user mobile airtime account module 28 communicates with a free minutes module 30, which in particular circumstances allocates free airtime minutes to the user mobile airtime account when a purchase request is received from a user. The mobile airtime account module 28 further communicates with the top-up module 32, which processes a request from a user of the mobile communication device 10 for the purchase of airtime minutes for the user's user mobile airtime account.

The data relating to multiple user's user mobile airtime accounts is stored in a mobile service provider database 34. Each user airtime account is associated and linked with the unique device identifier of the mobile communication device 10 of the user. The mobile communication device data, such as the IMSI number of the user's mobile communication device 10, is also stored in the database 34. The mobile service provider database 34 is also used to store user registration data and user mobile account data. This is discussed in more detail below.

The MSP architecture 16 includes an Application Program Interface (API) 36, which communicates with an Application Program Interface (API) 38 of a payment service provider system 40. A user registers with a payment service provider in order for the payment service provider system 40 to manage or process purchases made by the user via the user's mobile communication device. A registration module 42 facilitates the registration process of the user with the payment service provider. Such registration may be conducted over the Internet by filling in on-line forms, via the telephone or may be completed when the user visits a mobile service provider client station. A purchase request issued by a user is relayed via the MSP architecture 16 to the payment service provider system 40, which system, through a financial account module 44, automatically debits the at least one financial account of the user with the purchase amount, automatically allocates a service fee which is associated with the purchase amount to the mobile service provider, credits an account of the mobile service provider for this service fee, and automatically credits an account of the merchant with at least a portion of the purchase amount. The payment service provider system 40 is in communication with merchant systems 48 to obtain the relevant merchandise information. The payment service provider system 40 may also be in communication with financial institutions 50 in circumstances where the financial account of a user is with a financial institution.

The payment service provider system 40 also has a payment service provider database 46 associated with it, which stores data associated with users. The data is obtained through a registration process. In particular, the database stores mobile communication device data associated with each user, such as the IMSI number of the user's mobile communication device 10. This unique identification number is used to identify and associate a purchase request received from a user with the relevant user, the stored user data, and in particular the user's financial account. The database also stores merchant data which includes various merchant contact details and account details, thereby to facilitate the purchase of goods or services.

The system and method according to the example embodiments of this invention rely on the use of mobile communication devices for the purchase of goods or services. Users issuing purchase requests via mobile communication devices are not charged for the use of and access to the communication network when they make such purchase requests. As will be described in more detail later, a service fee included in the purchase price is allocated per purchase request, while a handling fee may or may not be allocated to the payment service provider. The example embodiments therefore provide for mobile telephone use and access to mobile communication networks for issuing purchase requests without airtime minutes.

According to an example embodiment of the method of the invention, mobile communication devices 10, (e.g., mobile phones) are provided to users without requiring a financial account to be set up for each user with a mobile service provider. Once a user has received a mobile phone from either a third party, which may be a merchant, a payment service provider or a mobile service provider, the user registers the mobile phone with a mobile service provider. As mentioned, registration may be facilitated on-line by filling in certain on-line documentation through a mobile service provider website. Alternatively, a user may visit a client center of a mobile service provider to register his mobile phone with the mobile service provider. By registering the mobile phone, a unique communication device number, such as the IMSI number, is associated with the mobile phone. Other user data, such as the name, postal and physical address may also be obtained and stored during this registration process. It will be appreciated that a user who already owns or uses a mobile phone and has a mobile telephone account with a mobile service provider will not need to register the mobile phone with the mobile service provider, as such registration typically occurs and registration data is typically gathered when the mobile phone account is activated.

The user also has to register with a payment service provider in order for the payment service provider to handle and facilitate purchase requests between the user, the mobile service provider and ultimately merchants. Registration with the payment service provider is similar to the mobile service provider registration process, e.g., registration may be facilitated through an on-line registration process, registration by filling in forms, or even registration by using SMS messages on mobile telephones. However, as the payment service provider is responsible for the debiting or crediting of a financial account of the user, user financial account data may be obtained during this registration process. Typically the required data includes the name of the account holder, the account number, the financial institution with which the financial account is kept and authorization from the user that the payment service provider may debit or credit the user's financial account. Where registration is conducted through SMS, the authorization aspect of registration may be conducted over the phone or by the user sending an authorization fax to the payment service provider. Data relating to the mobile telephone is also required, as a request from the user is routed through the mobile service provider, and the user and the user's account need to be identifiable. The example list of registration processes is not exhaustive, and other user-friendly systems and processes may be used.

The financial account of the user may either be an account (e.g., savings, cheque, credit or other) with a financial institution, or alternatively, the user may open a financial account with the payment service provider. An account with the payment service provider is operated either on a pre-payment basis, where the user deposits money into the account to make use of the payment service provider, or the user may be billed for any outstanding amounts on the account at certain predetermined intervals. For example, the user may receive an invoice at the end of each month for all purchases made through the payment service provider, while interest is charged on the outstanding amount at a rate according to market standards.

Merchants interested in using the system and method, according to the example embodiments of this invention, register with the payment service provider. Merchant data is stored on the payment service provider database 46 and typically includes the name and address of merchant, as well as an account name of the merchant account, the account number and the financial institution with which the merchant account is kept.

It will be appreciated that the mobile service provider may have an internal payment service provider system, which would obviate the duplicate registration process and separate databases for the mobile service provider and payment service provider.

Figure 2A:
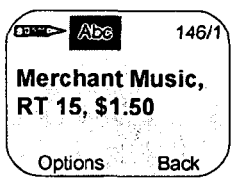
FIGS. 2A to 2G are a number of screenshots from the display screen of a mobile telephone using the method according to the example embodiment of FIG. 1.
Figure 2B:
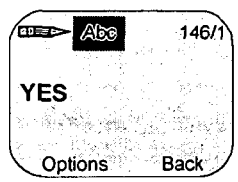
Figure 2C:
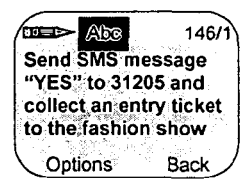

Once a user of a mobile communication device 10 has registered with the mobile service provider and payment service provider, the user can send a purchase request over the communication network to the mobile service provider. The mobile switching center 14 receives the request via the base station 12. The purchase request is for a purchase from one of the registered merchants of the payment service provider for a particular purchase amount. For example, the mobile phone user may see an advertisement for ring tone downloads from Merchant Music for $1.50 in a catalogue or newspaper. A purchase request to the mobile service provider may comprise an SMS message such as "Merchant Music, RT 15, $1.50". FIG. 2A provides a screenshot of a mobile phone display with this message. "Merchant Music" identifies the merchant from which the purchase should be made, RT 15 identifies the goods, e.g. Ring Tone 15 which may be a new release by Britney Spears, and $1.50 confirms the purchase amount of the goods. This message is typically sent to the short code of the payment service provider, e.g. 35505. Alternatively, the purchase request may be managed by an IVR system where the user is guided through different questions and answers to identify the merchant, goods or services purchased and purchase amount. It will be appreciated that the purchase request may comprise an SMS message confirmation, e.g., as seen in FIG. 2B, a message "YES" is sent to a particular short code. In this example certain goods may be advertised for purchase on the basis of a message as displayed in FIG. 2C "Send SMS message "YES" to 31205 and collect an entry ticket to the fashion show".

Figure 2D:
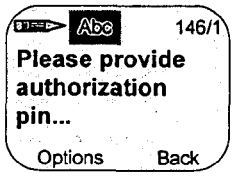

Once the mobile service provider has received the message request from the user of the mobile phone, the mobile service provider may prompt the user for authorization information to allow the purchase request to proceed. Such authorization information may be a secret pin or password that must be sent to a specific number or short code associated with the mobile service provider. An example of a prompt is shown in FIG. 2D.

In the event that the user of the mobile telephone is registered with both the mobile service provider and the payment service provider, the user access module 18 provides the user access to the communication network without debiting the user's financial or airtime account. Accordingly, the user of the mobile phone does not pay the mobile service provider for the access or use of the communication network when goods or services are purchased from a merchant.

The Application Program Interface (API) of the mobile service provider now routes the purchase request to the API of the payment service provider, who in turn routes the purchase request to the relevant merchant. The financial account module 46 of the payment service provider system 40 now automatically debits the financial account of the user with the purchase amount of the goods or services. The financial account module 44 further allocates a service fee, which is associated with the purchase amount to the mobile service provider. This service fee may be proportionate to the purchase amount, e.g. 6% of the purchase amount, or it may be a fixed service fee, e.g. $1.00 for each purchase request. The financial account module 44 then credits an account of the mobile service provider with the amount of the service fee. The financial account module 44 also credits the account of the relevant merchant with at least a portion of the purchase amount. The account module 44 may also credit an account of the payment service provider with a handling fee for handling the purchase request. Alternatively, the user may be required to pay a monthly subscription fee to the payment service provider, which subscription fee is not related to purchase requests or the amount of purchase requests.

If we return to our example of the purchase of a ring tone for $1.50 from Merchant Music, the user financial account is debited for the full amount of $1.50, the mobile service provider account is credited with $0.09 (i.e., 6% of the purchase amount of $1.50) and the merchant account is credited with $1.41. In the example embodiments of the invention, the mobile communication network is effectively a backbone for purchases via mobile phones, with the mobile service provider being cut in on the transaction, and not charging for the access, or service, as such.

The purchase request can be for any type of merchandise, whether it is mobile phone related goods or services such as ring tones or additional mailboxes, or whether it is for theatre or movie tickets, clothing from a catalogue or even motor vehicles.

The purchase request may also be made by the user by scrolling through menu options made available to the user. For example, the user may phone an 1 800 number and using an IVR system, may be guided through menu options of different goods and the purchase prices of the goods. Once the user has determined what the user is interested in purchasing, an option such as "To buy this home theatre system for $500, please re-enter your authorization number" or "Enter 5 to buy this home theatre system for $500".

Figure 2E:
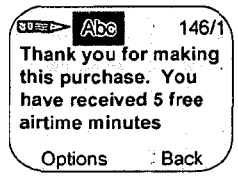

According to a further example embodiment, the user airtime account module allocates free airtime minutes to the user mobile airtime account on the receipt and responsive to a purchase request received from a user via the user's mobile phone. The number of free airtime minutes allocated to the user may be fixed, or may be dependent on the purchase amount. For example, for every ring tone purchased by a user, the user may receive one free airtime minute. Alternatively, should the user purchase goods or services to the value of $100, the user may receive 1 minute for every $10 spent on the merchandise. Once the free airtime minutes have been allocated to the user, a confirmation SMS may be sent to the user, as shown in FIG. 2E, e.g., "Thank you for making this purchase. You have received 5 free airtime minutes." The mobile service provider and/or payment service provider may restrict the time period in which the free airtime minutes may be used, e.g. free airtime minutes should be used within 3 days.

Figure 2F:
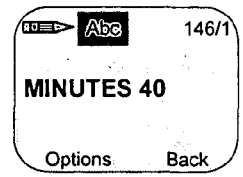

According to yet a further example embodiment, the purchase request received from the user of the mobile phone may be for the purchase of airtime. It will be appreciated that the "merchant" in this instance will be the mobile service provider. The purchase request is similar to the purchase requests described above. The user typically sends an SMS message, as shown in FIG. 2F, to the mobile service provider, the message being: "MINUTES 40", which translates into a purchase request for 40 airtime minutes. The access module 18 identifies the purchase request and provides the user free access to the communication network to make the request. Should the user not have a financial account with the mobile service provider, but only with the payment service provider, the API 36 of the mobile service provider routes the purchase request to the payment service provider. The financial account module 44 of the payment service provider now provides the user mobile account module 44 and the top-up module 32 of the mobile service provider with details on the purchase request. According to the request, the top-up module 32 credits the user mobile airtime account with 40 airtime minutes and the user mobile account module to debits the account of the mobile service provider with the relevant amount. This amount may be divided into a standard service fee for facilitating the request, with the remainder of the amount being for the minutes purchased. The account module 44 of the payment service provider also debits the financial account of the user with the value of 40 airtime minutes, which at a rate of $0.80 per minute would be $32.00.

Figure 2G:
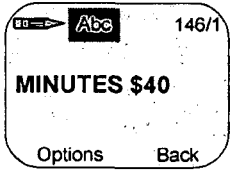

Alternatively, should the user require airtime minutes to the value of $40, the user may send an SMS message "MINUTES $40", shown in FIG. 2G, to the mobile service provider. At a rate of $0.80 per minute, the user airtime account is credited with 50 airtime minutes.

The top-up feature is particularly useful in combination with the mobile user for purchase requests without any airtime minutes, as a user may be in a situation where the user needs to make an urgent telephone call. As the purchase request (and airtime to make the purchase request) is not charged to the user, the user is now in a position to purchase airtime anywhere at any time.

This top-up feature may be extended to a situation where a call is in progress. Should the airtime minutes of a user be close to depletion while a call is in progress, the call can be interrupted by the IVR system (which received instructions from the top-up module) prior to the depletion of the last airtime minute, with the IVR system warning the user with a message such as "You have 30 seconds remaining." The call may also be put on hold at the expiry of the airtime. The system may prompt the user to either enter a particular number or user's authorization information to instantly purchase further airtime minutes. For example, the IVR system may prompt the user with a message such as "Airtime has run out, press # and enter to instantly purchase an extra 5 minutes of airtime". Alternatively, the message may be "Airtime has run out, enter your PIN and press enter to instantly purchase an extra 5 minutes of airtime." As before, once the purchase request has been facilitated, a confirmation SMS is sent to the user, e.g. "Thank you, you have purchased 5 airtime minutes @ $4.00."

Figure 3:
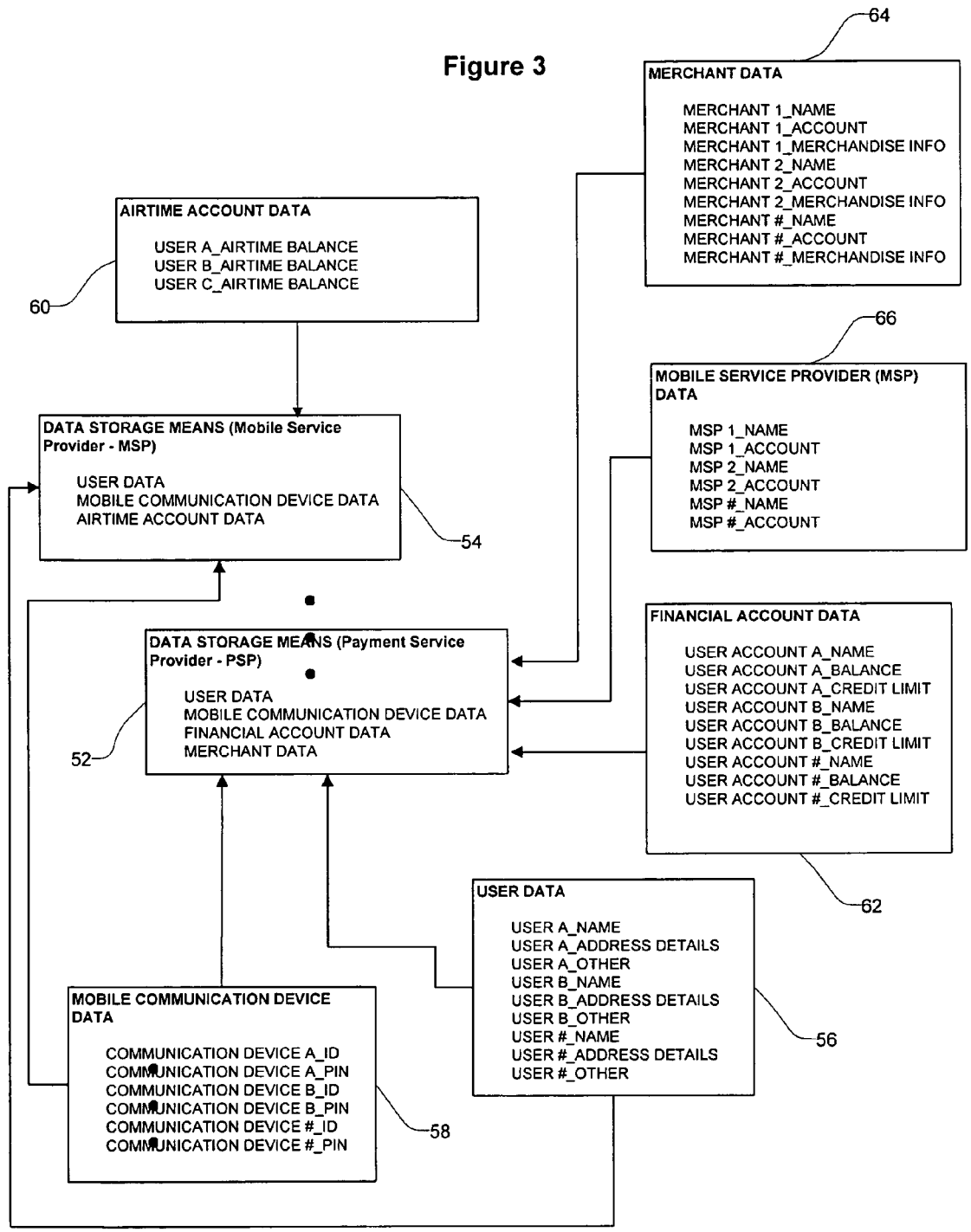
FIG. 3 is a block diagram illustrating the data architecture of information stored in memory according to the example embodiment of FIG. 1.

Turning to FIG. 3, a block diagram illustrating the data architecture of information stored in memory according to the example embodiments of the invention is shown. The memory or data storage means is typically a mobile service provider database 52 and a payment service provider database 54.

As mentioned before, the mobile service provider database stores user data 56, including the name, address and other details of a user's mobile communication devices registered with the mobile service provider. The mobile service provider database 52 also stores mobile communication device data 58, which includes a unique identification number such as the IMSI number of the mobile communication device for each communication device. This unique number is linked to the user's user data. The mobile communication device data also includes authorization information such as a PIN or a password, which is used by the user of a mobile communication device to authorize the purchase request and to provide a more secure transaction. The mobile service provider database 52 further stores user airtime account data 60 which includes a record of the balance of airtime available to the user. This record is updated whenever airtime minutes are used or purchased.

The payment service provider database 54 also stores user data 56 and communication device data 58 similar to that described above. This database 54 further stores financial account data 62 relating to each user registered with the payment service provider. The data includes the account details, e.g., name of the account, type of account, financial institution where the account is held, as well as the account balance and credit limit (if applicable) of the account.

Other data stored in the payment service provider database is merchant data 64, including the merchant name, account details and merchandise information relating to the merchandise which a user can purchase through a purchase request. Such merchandise information may be linked to the IVR system of the mobile service provider system 16, thereby allowing the user to listen to a list of menu items with related merchandise when making a purchase request.

The data service provider database may also store the name and account details of a number of mobile service providers 66, to allow the payment service provider system 40 to make payments into the accounts of such mobile service providers.

Figure 4:
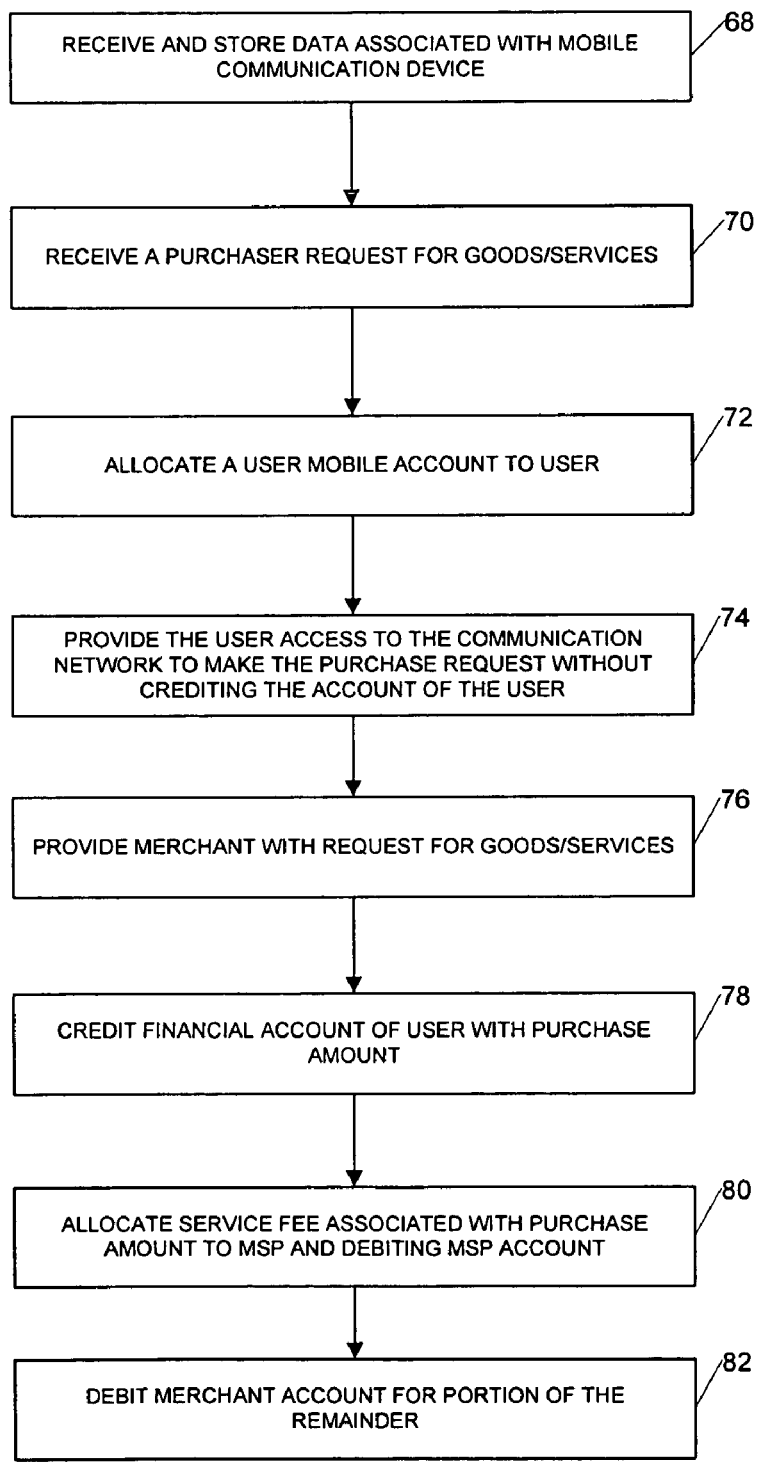
FIG. 4 is a flow diagram of a method for conducting financial transactions over a communication network according to an example embodiment of the present invention.

A flow diagram of a simplified example method is shown in FIG. 4. In operation 68, data associated with a mobile communication device user is received and stored, the data identifying at least one financial account of the user. A user mobile airtime account is allocated to a user in operation 70, with the airtime account managing the airtime availability of the user. In operation 72, a purchase request is received from the user via a mobile communication device 10, wherein the purchase request is for a purchase from a merchant for a purchase amount. The user is now provided with access to the communication network to make the purchase request without debiting the financial account of the user or the user mobile airtime account for the access to the communication network, as shown in operation 74. In one embodiment, this access is provided by not debiting an account associated with the user for the access for a user-initiated call. In another embodiment, upon receiving a cell phone short code identifying a product or service, a callback to the cell phone of the user may be initiated so that the user does not pay for the call.

The purchase request is provided to the merchant for further processing in operation 76. In operations 78 and 80 respectively, the at least one financial account of the user is automatically debited with the purchase amount, a service fee which is associated with the purchase amount is automatically allocated to the mobile service provider and an account of the mobile service provider is debited with the service fee. As shown in operation 82, an account of the merchant is automatically credited with at least a portion of a remainder of the purchase amount.

Figure 5:
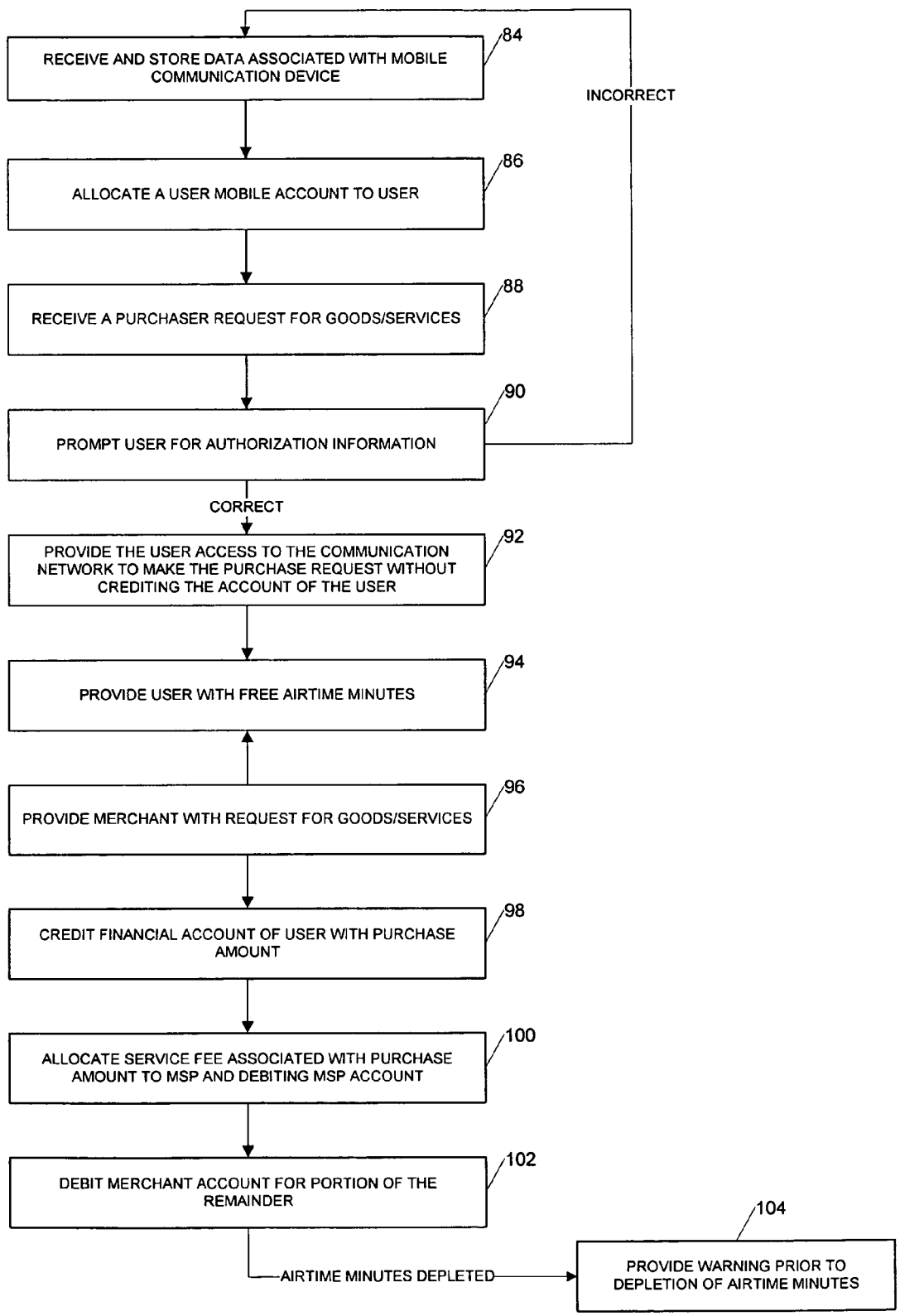
FIG. 5 is a further flow diagram of the method for conducting financial transactions over a communication network according to a detailed example embodiment of the present invention.

FIG. 5 shows a flow diagram of a more detailed example embodiment of the present invention. The operations of this method are similar to the method described according to FIG. 4. However, this method includes an operation 90 which prompts the user of the mobile communication device 10 for authorization information, such as a PIN, after the purchase request has been received in operation 88. In the event where the correct authorization information is received from the user, the processing of the purchase request proceeds. Should the authorization information be incorrect, the processing of the purchase request will abort. This method further includes the provision of free airtime minutes to a user's user mobile account on the receipt of a purchase request, as indicated in operation 94. Lastly, in the event that the user's airtime minutes are nearing depletion, a warning is provided to the user in operation 104 prior to the depletion of the user's airtime minutes.

Figure 6:
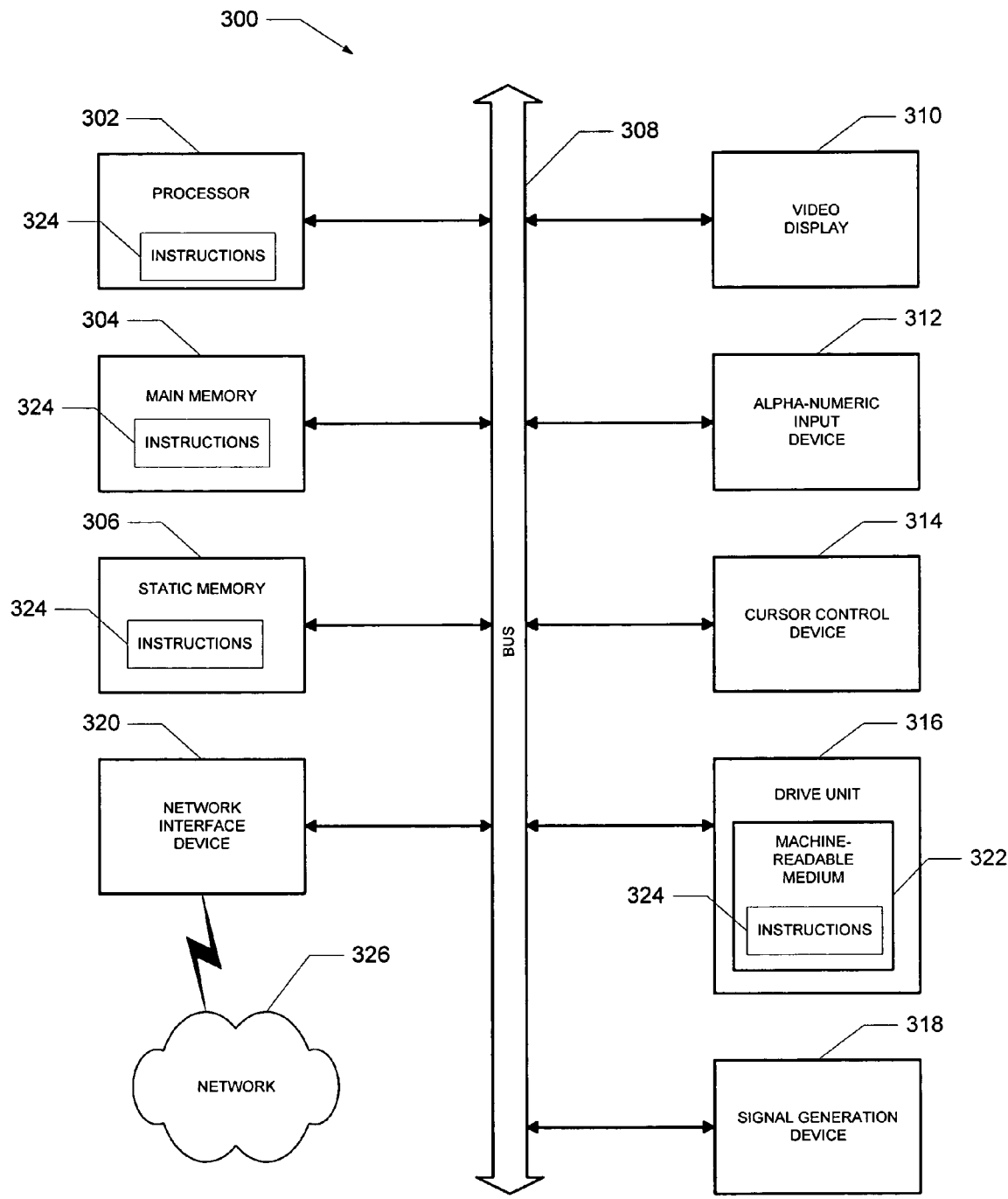
FIG. 6 is a block diagram showing a machine for performing any one of the exemplary methods described herein.

FIG. 6 shows a diagrammatic representation of machine in the exemplary form of a computer system 300 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 300 includes a processor 302 (e.g., a central processing unit (CPU), a graphics processing unit (GPU) or both), a main memory 304 and a static memory 306, which communicate with each other via a bus 308. The computer system 300 may further include a video display unit 310 (e.g., a liquid crystal display (LCD) or a cathode ray tube (CRT)). The computer system 300 also includes an alphanumeric input device 312 (e.g., a keyboard), a user interface (UI) navigation device 314 (e.g., a mouse), a disk drive unit 316, a signal generation device 318 (e.g., a speaker) and a network interface device 320.

The disk drive unit 316 includes a machine-readable medium 322 on which is stored one or more sets of instructions and data structures (e.g., software 324) embodying or utilized by any one or more of the methodologies or functions described herein. The software 324 may also reside, completely or at least partially, within the main memory 304 and/or within the processor 302 during execution thereof by the computer system 300, the main memory 304 and the processor 302 also constituting machine-readable media.

The software 324 may further be transmitted or received over a network 326 via the network interface device 320 utilizing any one of a number of well-known transfer protocols (e.g., HTTP).

While the machine-readable medium 322 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals. Although an embodiment of the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A system to conduct financial transactions over a communication network, the system including:
 - a database storing data associated with a mobile communication device user, the data including a user mobile communication device identifier, user mobile airtime account identifier and financial account identifier for a financial account associated with the user, the financial account being with a financial institution;
 - purchase request infrastructure to receive a purchase request from the user via a mobile telephony communication device, the purchase request being for a good or service from a merchant for a purchase amount, the purchase request infrastructure including at least one of a group of systems including an IVR system, a short code module, or a short message service module, the purchase request being made by the user by scrolling through menu options made available to the user through at least one of the IVR systems and the short message service module;
 - an access module with screening logic to identify the purchase request and to provide the user access to the communication network through a mobile service provider to make the purchase request without debiting the financial account of the user or the user's mobile airtime account for the access to the communication network;
a user mobile airtime account module to manage airtime availability of the user's mobile telephony communication device via the user mobile airtime account; and
a payment service provider system to:
provide the merchant with the purchase request;
identify the financial account of the user based on the financial account identifier;
automatically debit the financial account of the user with the purchase amount;
automatically allocate a service fee which is associated with the purchase amount to the mobile service provider and crediting an account of the mobile service provider for the service fee; and
automatically credit an account of the merchant with at least a portion of the purchase amount.

2. A system according to claim 1, including a free minutes module to allocate free airtime minutes to the user mobile airtime account when the purchase request is received from the user.

3. A system according to claim 2, wherein a number of free airtime minutes allocated to the user mobile airtime account is dependent on the purchase amount.

4. A system according to claim 2, wherein a number of free airtime minutes allocated to the user mobile airtime account is fixed for each purchase request received.

5. A system according to claim 1, wherein the purchase request is for airtime minutes, and wherein the system includes a top-up module to process the purchase request from the user to purchase the airtime minutes for the user mobile airtime account.

6. A system according to claim 5, wherein the top-up module and IVR system provide the user with a warning prior to the depletion of the user's airtime minutes.

7. A system according to claim 1, wherein the payment service provider system includes a registration module to facilitate the registration of the user to the payment service provider.

8. A system according to claim 1 wherein the payment service provider system includes an application program interface to communicate with the mobile service provider.

9. A system according to claim 1 wherein the mobile service provider system includes an application program interface to communicate with the payment service provider.

10. A method of conducting financial transactions over a communication network, the method including:
receiving and storing data associated with a mobile communication device user, the data identifying at least one financial account of the user, the financial account being with a financial institution;
allocating a user mobile airtime account to the user to manage airtime availability of the user;
receiving a purchase request from the user via a mobile telephony communication device, the purchase request being for a good or service from a merchant for a purchase amount, the purchase request being received by at least one of a group including an IVR system, a short code module, or a short message service module, the purchase request being made by the user by scrolling through menu options made available to the user through at least one of the IVR systems and the short message service module;
granting the user access to the communication network to make the purchase request through a mobile service provider without debiting the financial account of the user or the user's mobile airtime account for the access to the communication network;
managing airtime availability of the user's mobile telephony communication device via the user mobile airtime account;
supplying the merchant with the purchase request;
identifying the financial account of the user based on the financial account identifier;
automatically debiting the financial account of the user with the purchase amount;
automatically allocating a service fee, which is associated with the purchase amount, to the mobile service provider and crediting an account of the mobile service provider with the service fee; and
automatically crediting an account of the merchant with at least a portion of a remainder of the purchase amount.

11. The method of claim 10, including prompting the user for authorization information after receiving the purchase request.

12. The method of claim 11, wherein the purchase request from the user is to purchase airtime minutes for the user mobile airtime account.

13. The method of claim 12, further including providing the user with a warning prior to the depletion of the user's airtime minutes.

14. The method of claim 10, including allocating free airtime minutes to the user mobile airtime account responsive to receipt of the purchase request.

15. The method of claim 14, wherein a number of free airtime minutes allocated to the user mobile airtime account is dependent on the purchase amount.

16. A method according to claim 14, wherein a number of free airtime minutes allocated to the user mobile airtime account is fixed for each purchase request received.

17. A non-transitory machine-readable storage medium comprising instructions, which when executed by a machine, cause the machine to perform the following operations, comprising:
receive and store data associated with a mobile communication device user, the data identifying at least one financial account of the user, the financial account being with a financial institution;
allocate a user mobile airtime account to the user to manage airtime availability of the user;
receive a purchase request from the user via a mobile telephony communication device, the purchase request being for a good or service from a merchant for a purchase amount, the purchase request being received by at least one of a group including an IVR system, a short code module, or a short message service module, the purchase request being made by the user by scrolling through menu options made available to the user through at least one of the IVR systems and the short message service module;
grant the user access to the communication network through a mobile service provider to make the purchase request without debiting the financial account of the user or the user's user mobile airtime account for the access to the communication network;
manage airtime availability of the user's mobile telephony communication device via the user mobile airtime account;
supply the merchant with the purchase request;
identify the financial account of the user based on the financial account identifier;
automatically debit the financial account of the user with the purchase amount;

automatically allocate a service fee, which is associated with the purchase amount, to the mobile service provider and crediting an account of the mobile service provider with the service fee; and automatically credit an account of the merchant with at least a portion of a remainder of the purchase amount.

18. A system to conduct financial transactions over a communication network, the system including:
- first means for storing data associated with a mobile communication device user, the data including a user mobile communication device identifier, a user mobile airtime account identifier and a financial account identifier for at least one financial account associated with the user, the financial account being with a financial institution;
- second means for receiving a purchase request from the user via a mobile telephony communication device, the purchase request being for a good or service from a merchant for a purchase amount, the second means including at least one of a an IVR means, a short code module, or a short message service module, the purchase request being made by the user by scrolling through menu options made available to the user through at least one of the IVR systems and the short message service module;
- third means for identifying the purchase request and for providing the user access to the communication network through a mobile service provider to issue the purchase request without debiting the financial account of the user or the user's mobile airtime account for the access to the communication network, the third means having a screening logic;
- a user mobile airtime account module to manage airtime availability of the user's mobile telephony communication device via the user mobile airtime account; and
- fourth means for providing the merchant with the purchase request, the fourth means further for:
  - identifying the financial account of the user based on the financial account identifier;
  - automatically debiting the financial account of the user with the purchase amount;
  - automatically allocating a service fee which is associated with the purchase amount to the mobile service provider and crediting an account of the mobile service provider for the service fee; and
  - automatically crediting an account of the merchant with at least a portion of the purchase amount.

19. A system according to claim 18, including sixth means for allocating free airtime minutes to the user mobile airtime account when the purchase request is received from the user.

20. A system according to claim 19, wherein a number of free airtime minutes allocated to the user mobile airtime account is dependent on the purchase amount.

21. A system according to claim 19, wherein a number of free airtime minutes allocated to the user mobile airtime account is fixed for each purchase request received.

22. A system according to claim 18, wherein the purchase request is for airtime minutes, and wherein the system includes a seventh means for processing the purchase request from the user to purchase the airtime minutes for the user mobile airtime account.

23. A system according to claim 22, wherein the seventh means is for providing the user with a warning prior to the depletion of the user's airtime minutes.

24. A system according to claim 18, wherein the fourth means includes an eighth means to facilitate the registration of the user to the payment service provider.

* * * * *